United States Patent [19]
Obermeyer

[11] Patent Number: 4,772,157
[45] Date of Patent: Sep. 20, 1988

[54] LIQUID LEVEL CONTROL SYSTEM AND METHOD OF OPERATING THE SAME

[76] Inventor: Henry K. Obermeyer, 36 Wickhams Fancy, Rivers Edge Rd., Collinsville, Conn. 06022

[21] Appl. No.: 39,579
[22] Filed: Apr. 16, 1987
[51] Int. Cl.⁴ ............................ E02B 7/20; E02B 9/00
[52] U.S. Cl. ........................................ 405/75; 405/78; 405/92; 137/386
[58] Field of Search ................. 405/75, 78, 87, 92–97; 137/386, 392, 395, 399

[56] References Cited

U.S. PATENT DOCUMENTS

| | | | |
|---|---|---|---|
| 838,617 | 12/1906 | Golwig | 405/78 |
| 2,041,576 | 5/1936 | Suksdorf | 405/96 |
| 4,332,507 | 6/1982 | Wakamori et al. | 405/92 |
| 4,498,809 | 2/1985 | Farmer | 405/92 |
| 4,604,681 | 8/1986 | Sakashita | 405/92 X |

*Primary Examiner*—David H. Corbin
*Attorney, Agent, or Firm*—Victor E. Libert

[57] ABSTRACT

A control apparatus responsive to the difference between liquid levels, and a method of controlling a liquid flow regulator by use of the apparatus is disclosed. The control apparatus may comprise a transducer responsive to the back-pressure maintained in a bubbler system including a pair of interconnected gas bubblers, one positioned upstream and one downstream of a flow restriction, such as a trash screen protecting the inlet to a hydroelectric turbine. The mouth of the downstream bubbler is positioned at a pre-selected elevation below that of the mouth of the upstream bubbler so that the pressure head of water at the mouth of the upstream bubbler sets the system back-pressure. When the downstream water level drops sufficiently below that of the upstream water level, the reduced water pressure head at the mouth of the downstream bubbler sets the system back-pressure. A flow regulator, such as a turbine wicket gate, is operated in response to the control apparatus.

16 Claims, 2 Drawing Sheets

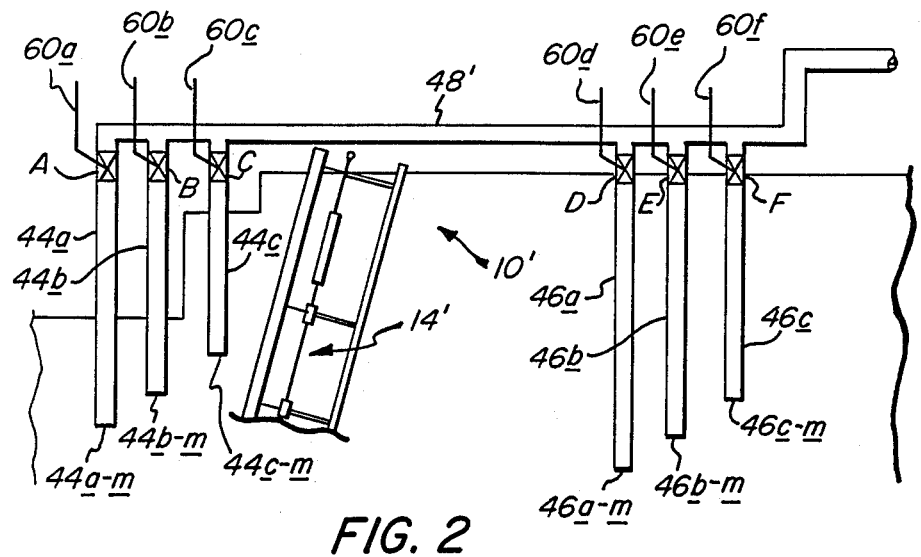
FIG. 2
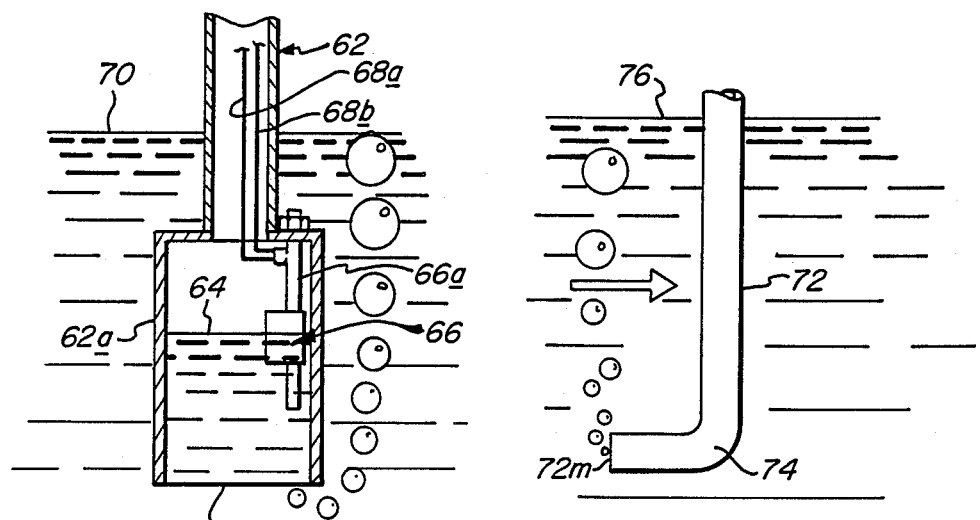
FIG. 3
FIG. 4

LIQUID LEVEL CONTROL SYSTEM AND METHOD OF OPERATING THE SAME

BACKGROUND OF THE INVENTION

1. Field of the Invention

The present invention is concerned with a liquid level control system, more particularly with a liquid level control system utilizable to regulate the flow of water through a hydraulic turbine in response to sensed water levels upstream and downstream of a flow restriction in the water course.

2. Description of Related Art and Conventional Practices

U.S. Pat. No. 2,092,623 (Kuster) discloses a pair of gas bubblers, one positioned upstream and one downstream of a trash screen through which a liquid flows. Both bubblers are connected via a pressure drop orifice to opposite sides of a mercury switch which controls a power rake used to clean the trash screen. The mouths of the bubblers are positioned at the same elevation so that a back-pressure differential, which develops between the bubblers when the downstream liquid level drops due to accumulated trash on the screen, displaces mercury to close the switch and actuate automatic raking of the screen. Clearing the screen tends to equalize the upstream and downstream levels, thereby reducing the back-pressure differential and opening the switch.

U.S. Pat. No. 3,476,538 (Trethewey) discloses controlling the flow of molten glass through a flow restriction by utilizing (FIGS. 1 and 3-5) a pair of bubblers, one positioned upstream and one downstream of the flow restriction and having their mouths at the same elevation. The FIG. 2 embodiment utilizes surface level detectors such as contact or pneumatic probes. The sensed difference in upstream and downstream levels is used to record and/or control the flow rate.

U.S. Pat. No. 3,573,019 (Rees) is also concerned with a flow measuring device for molten glass which uses a pair of bubblers which have their respective outlet ends facing, respectively, towards and away from the direction of flow of the molten glass (FIG. 1). The mouths of the opposite facing bubblers are at the same elevation and the pressure differential due to flow of the glass into one of the mouths and away from the other is used to monitor the flow rate.

U.S. Pat. No. 1,975,710 (Borden) shows a device for remotely recording the level of a body of liquid. A compressed-air bubbler is connected to a tank containing an indicating liquid and the feed of compressed air to the bubbler is made responsive to the surface level of the body of liquid by a float thereon which is connected so as to operate the compressed air supply valve.

U.S. Pat. No. 1,662,248 (Jacob) shows a weir flow rate gauge which includes a pair of leads positioned, respectively, upstream and downstream of the weir with the mouths or open ends of the leads being submerged beneath the liquid. The elevation of the mouths of the leads beneath their respective levels of liquid is immaterial.

The hydroelectric energy obtainable from flowing water is proportional to the product of available head times flow. Accordingly, energy generation is maximized if the rate of water flow through the hydroelectric turbine or turbines is commensurate with the highest available water level, i.e., the spillway crest of a dam. From this point of view, the most desirable location for measuring the available water level is adjacent to the spillway, which is upstream of the trash racks or trash screens used to protect the inlet to hydroelectric turbines. This location presents no problem if the water levels upstream and downstream of the trash screen are the same, or nearly so. However, if debris or ice obstructs the trash screen, the water level on the downstream side of the trash screen will drop and that on the upstream side of the trash screen will rise. A conventional water control system measuring only the upstream level will increase the turbine discharge, i.e., the flow rate through the turbine, in response to the rising upstream water level. The turbine thus operates in response to a false water head reading and the increased draw of water from the water box on the downstream side of the trash screen tends to deplete the water available in the water box and, if the screen is sufficiently clogged, the result may be consumption of nearly all the water downstream of the trash screen so that air as well as water may enter the turbines. Under such conditions, the turbines may eventually end up pumping water downstream and consuming rather than producing electrical power, although controls are usually provided for automatic shutdown of the plant as soon as such reverse flow of electrical energy is detected. Another, although less severe, disadvantage of such drawdown of water on the downstream side of a clogged trash screen is that the resulting high differential pressure across the debris on the trash screen may make removal of the debris difficult or impossible. Conventional practice for plants which utilize water control systems measured upstream of the trash rack is to switch the plant to manual control and operate at reduced output during periods of severe clogging of the trash screen.

On the other hand, if a plant utilizes a control system which measures the water level downstream of the trash screens, such plants operate at a somewhat reduced head at low flow rates even when there is only a small difference in between the upstream and downstream water levels, e.g., between the spillway and the plant intake levels. Thus, even minor clogging or blockage of the trash screen adversely affects energy output. These and other shortcomings of conventional control systems are overcome by the present invention.

SUMMARY OF THE INVENTION

In accordance with the present invention there is provided a control apparatus which is responsive to liquid levels upstream and downstream of a flow restriction in a courseway of the liquid, for example, a control apparatus responsive to water levels in a water course. The apparatus comprises the following components. An upstream liquid level sensor comprising means to generate an upstream signal proportional to the upstream liquid level, and a downstream liquid level sensor comprising means to generate a downstream signal proportional to the downstream liquid level are provided. The upstream and downstream liquid level sensors, which may comprise gas bubblers, have a transducer means connected to both of them. The transducer means comprises means to generate a control signal which is normally responsive to the upstream signal but becomes responsive to the downstream signal when, due to relative lowering of the downstream liquid level with respect to the upstream liquid level, the magnitude of the difference between the upstream and downstream signals exceeds a pre-selected value.

The apparatus of the invention may further include a flow regulator, e.g., a turbine wicket gate, runner blades, and/or needle valves, located in the courseway downstream of the flow restriction and responsive to the transducer for operation of the flow regulator in response to the control signal.

Thus, in one aspect of the present invention the control apparatus is responsive to respective water levels upstream and downstream of a flow restriction, which may comprise a trash screen or the like, located in the water course upstream of the water gate and the apparatus may comprise components including a bubbler system comprising an upstream gas bubbler and a downstream gas bubbler connected in gas flow communication with each other and to a source of compressed gas. The upstream bubbler has an upstream mouth and the downstream bubbler has a downstream mouth which is positioned at an elevation below that of the upstream mouth. In this way, pressurization of the bubblers with both mouths submerged below water provides a commom system pressure. Another component of the apparatus is a transducer means connected to the bubbler system and comprising means to generate a control signal in response to the system pressure, which is normally determined by the pressure head imposed on the upstream mouth by the upstream water level. However, the system pressure will be determined by the pressure head imposed on the downstream mouth by the downstream water level when, due to the lowering of the downstream water level relative to the upstream water level, the magnitude of the difference between the upstream and downstream water levels exceeds the difference in elevation between the upstream mouth and the downstream mouth.

Another aspect of the invention provides for an auxiliary water level sensing means located within at least one of the bubblers adjacent to the mouth thereof and connected to a remote signal receptor to provide to the receptor a signal responsive to the water level within the bubbler containing the auxiliary sensing means.

The present invention also provides a method for controlling operating mechanisms, such as those which operate wicket gates, runner blades, needle valves or other flow regulator devices for controlling the flow of water through a hydroelectric turbine. Control is effectuated by means of a control apparatus responsive to respective liquid levels upstream and downstream of a flow restriction in the courseway of the liquid, for example, responsive to the water levels in a water course. The method comprises sensing the upstream liquid level and generating an upstream signal which is proportional to the upstream liquid level, and sensing the downstream liquid level and generating a downstream signal which is proportional to the downstream liquid level. A control signal is generated in response to the upstream signal, unless the magnitude of the difference between the upstream and downstream signals in response to a lowering of the downstream liquid level relative to the upstream liquid level exceeds a pre-selected value, in which case the control signal is generated in response to the downstream signal. The control signal is transmitted to the flow regulator in order to operate it in response to the control signal.

In one aspect of the method of the invention, the upstream and downstream signals are generated by sensing the system pressure generated by equally pressurizing a gas bubbler system comprised of an upstream bubbler and a downstream bubbler connected in gas flow communication with each other, the upstream bubbler having an upstream mouth and the downstream bubbler having a downstream mouth positioned at an elevation below that of the upstream mouth. Both mouths are maintained below the surface of the liquid so that the upstream mouth is sealed by the liquid pressure head imposed on it by the upstream liquid level, and the downstrem mouth is sealed by the liquid pressure head imposed on it by the downstream pressure level. In this way, the system pressure is determined by the lower of the pressure heads existing at the upstream and downstream mouths.

Other aspects of the invention are apparent from the following description.

BRIEF DESCRIPTION OF THE DRAWINGS

FIG. 2 is a partial schematic view of a control apparatus comprising another embodiment of the present invention which includes a plurality of upstream and downstream bubblers;

FIG. 3 is a schematic, cross-sectional view in elevation of the lower end of a gas bubbler of the type utilizable in the apparatus of FIG. 1 or FIG. 2, including a float switch mounted within the lower end of the bubbler; and FIG. 4 is a schematic view in elevation of the lower end of another embodiment of a gas bubbler of the type utilizable in the apparatus of FIG. 1 or FIG. 2.

DETAILED DESCRIPTION OF THE INVENTION INCLUDING PREFERRED EMBODIMENTS THEREOF

Figure 1:
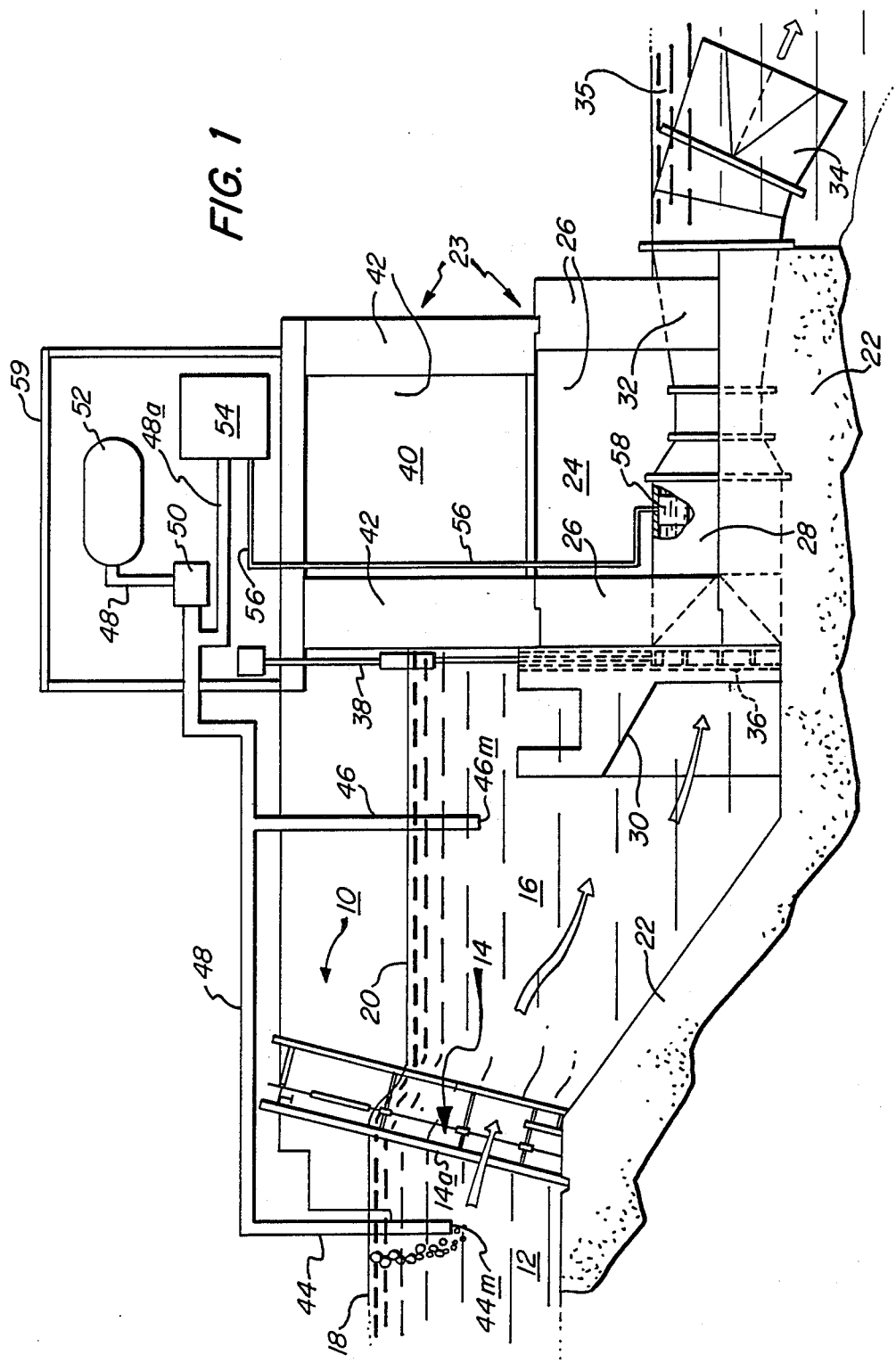
FIG. 1 is a schematic side view in elevation of a dam site having an hydraulic turbine inlet protected by a trash screen and including a control apparatus comprising one embodiment of the present invention.

Referring now to FIG. 1, a dam is generally indicated at 10 and controls the flow of water into a pond 12 from which the water flows in the direction indicated by the un-numbered arrows through a trash screen 14 which serves to trap debris in the pond water to prevent the entry of such debris into water box 16. The upstream face 14a of trash screen 14 comprises a suitable screen or foraminous grid structure which will admit the flow of water therethrough and screen out or trap debris. The remainder of trash screen 14 comprises structural members which secure upstream face 14a in place to dam 10 and footing 22. Footing 22 defines the bottom of pond 12 and water box 16 and extends to provide a foundation for the turbine room, as described below. Trash screen 14, particularly when partially clogged by ice and/or debris, serves as a flow restriction to the flow of water from pond 12 to water box 16, as a consequence of which the upstream water level 18 may be at a higher elevation than the downstream water level 20. As used in the specification and in the claims, reference to "upstream" and "downstream" is made with reference to the flow restriction.

A power house generally indicated at 23 includes a turbine room 24 defined by turbine room walls 26 of reinforced concrete construction supported upon footing 22. A turbine conduit 28 extends through turbine room 24 and contains a conventional hydraulically-driven turbine generator (not shown). A plurality of such turbine conduits containing respective turbine generators may be contained in turbine room 24. A water inlet 30 receives water flowing from water box 16 and then into turbine conduit 28 for passage therethrough to drive the turbine generator, the spent water being discharged through draft tube 32 and outlet 34 as tail water 35. A water gate 36 of conventional structure is operated by a conventional water gate control mechanism 38 to adjust the rate of flow of water therethrough, thence into turbine conduit 28. A gallery 40, defined by walls 42 and located above turbine room 24, permits access to the latter and may be equipped with an overhead crane or the like to faciliate servicing of the turbine generator. The foregoing structure is conventional and is illustrative of typical, known configurations of a dam having one or a plurality of hydroelectric generators associated therewith.

Water flow through hydroelectric turbines is conventionally controlled by sensing the level of the water flowing to the turbine so that a flow regulator which regulates water flow through the turbine may be properly adjusted, depending upon the available head of water flowing to the water inlet 30. Conventionally, the water level is sensed by means of a "gas bubbler" or, simply "bubbler" which comprises a vertical pipe placed in the water at the spillway, upstream of the trash screen 14, with its lower, open end defining the mouth of the bubbler. The pipe is supplied with compressed air and the pressure head of water sealing the mouth of the bubbler establishes the air pressure maintainable in the system. When the supplied air pressure exceeds the pressure head of the depth of water above the mouth, the compressed air escapes and bubbles to the surface. A transducer connected to the bubbler pipe senses the pressure in the bubbler and controls water flow through the turbine by generating a control signal in response to the sensed pressure, which control signal is transmitted to a suitable flow regulator such as one or more wicket gates, runner blades, needle valves or other devices conventionally employed to control turbine discharge, to appropriately adjust the flow regulator setting. The bubbler pressure thus provides a water level signal which is converted by the transducer into a control signal. The control signal may be an electrical or pneumatic signal conveyed from the transducer via an appropriate signal line.

The water level signal is typically used to control the amount of water consumed by the hydroelectric power plant either by adjusting the water flow rate through the turbine (by adjusting the turbine wicket gates, runner blades, etc.) or by starting and stopping the turbine generator unit or units. However, when the trash screen becomes sufficiently clogged by debris and/or ice the efficiency of operation is adversely affected by the resulting difference in water levels upstream and downstream of the trash screen. This is illustrated in FIG. 1, which shows the upstream level 18 in the pond 12 to be higher than the downstream level 20 in the water box 16. If only an upstream bubbler is employed, gating of water flow to the turbine is controlled only by sensing the upstream water level 18. Because the efficiency of a hydroelectric turbine is a function of the flow rate and pressure head of water acting upon it, inefficient operation, or even shut-down of the turbine, may result when the water to the turbine is gated in response to only the upstream level 18 or only the downstream level 20, as explained above. By providing both an upstream and a downstream liquid level sensor as provided by the present invention, and operating in reponse to the level sensed by the downstream level sensor only when the difference between the upstream and downstream levels ("liquid level differential" or "water level differential") exceeds a predetermined amount, efficient operation and a smooth, continuous control signal is provided which does not fluctuate between upstream and downstream level-generated signals. When the water level differential does not exceed the pre-selected amount, the upstream level controls the operation.

As illustrated in FIG. 1, an upstream bubbler 44 has a mouth or gas-release point 44m defined by the lower, open end of bubbler 44, which essentially comprises a hollow pipe. Similarly, a downstream bubbler 46 of substantially identical configuration to upstream bubbler 44 has a mouth 46m. The downstream mouth 46m is positioned at an elevation below that of the upstream mouth 44m, and both upstream bubbler 44 and downstream bubbler 46 are connected to a compressed air manifold 48 which is in turn connected in flow communication via a pressure regulator 50 to an air compressor 52. A branch connection 48a connects compressed air manifold 48 to a transducer 54 which is connected by a signal line 56 to a conventional flow regulator 58 mounted within turbine conduit 28, a portion of which is broken away for purposes of illustration. Flow regulator 58 may comprise conventional wicket gates, runner blades and/or needle valves of the turbine generator (not shown) within conduit 28. Air compressor 52 and its associated pressure regulator 50, as well as transducer 54, are conveniently housed within an enclosure 59 to protect them and their associated wiring, controls and instrument panels from the elements.

In operation, water flows from pond 12 into water box 16 thence via water gate 36 through turbine conduit 28 to turn the turbine blades and generate electric power which is conducted by power lines (not shown) to the point or points of use. Because mouth 46m of downstream bubbler 46 is positioned at a selected elevation below mouth 44m of upstream bubbler 44, when upstream level 18 and downstream level 20 are identical, the static pressure head of water at downstream mouth 46m is greater than that at upstream mouth 44m by a head of water equal to the differential in elevation between mouths 44m and 46m. (It will be appreciated by those skilled in the art that in order to maintain a backpressure in the bubbler system, both the upstream and downstream mouths must be submerged below the surface of the liquid, i.e., water in the illustrated embodiment.) As the pressure of compressed air in manifold 48 is increased by regulator 50, the compressed air will escape first from mouth 44m of upstream bubbler 44 when the air pressure in bubbler 44 exceeds the pressure head of the water at mouth 44m. The escape of air is indicated by the bubbles emanating from bubbler 44 in FIG. 1. Under these conditions, the back-pressure sensed in branch connector 48a and transmitted to transducer 54 will be determined by the pressure head existing at mouth 44m. Transducer 54 senses the backpressure in compressed air manifold 48 and converts it to a control signal in response, under these conditions, to the upstream level 18. The control signal is transmitted via signal line 56 to flow regulator 58, which is thereby appropriately set to regulate the flow of water through the turbine for the water level (18) which is generating the control signal.

As trash screen 14 becomes increasingly clogged with ice and/or debris, the flow of water through it is increasingly restricted, resulting in a dropping of the downstream water level 20 relative to upstream water level 18. When the elevation difference between upstream water level 18 and downstream water level 20 becomes greater than the elevation difference between mouth 46m and mouth 44m, the static pressure head at downstream mouth 46m will become less than that at upstream mouth 44m. At this point, compressed air will begin to escape from downstream bubbler 46 and cease to escape from upstream bubbler 44, the lower pressure at mouth 46m determining the back-pressure in manifold 48. Accordingly, the control signal transmitted from transducer 54 to flow regulator 58 will be determined by the downstream water level 20 under these conditions, that is, when downstream water level 20 drops below upstream level 18 by an amount greater than the elevation difference between upstream mouth 44m and downstream mouth 46m (the "mouth elevation differential"). With this arrangement, minor fluctuations in downstream water level 20 relative to upstream water level 18, i.e., fluctuations less than the preselected mouth elevation differential, do not interrupt the steady control signal generated by the upstream water level 18. By timely cleaning of trash screen 14 or otherwise insuring adequate flow to water box 16, uninterrupted operation based on the water flow available upstream of the trash screen is attained. Thus, if the mouth elevation differential is set at six inches, control of flow regulator 58 will be determined by upstream level 18 unless and until downstream level 20 drops more than six inches below upstream level 18. The skilled practitioner will select a mouth elevation differential appropriate to the conditions at a specific site and may from time to time change the mouth elevation differential to accommodate changed conditions.

Referring now to FIG. 2, there is shown a partial view generally corresponding to a portion of FIG. 1 in which corresponding or similar parts are identically numbered to those in FIG. 1 except for the addition of a prime indicator. Thus, a compressed air manifold 48' conducts compressed air to a plurality of upstream bubblers 44a, 44b and 44c and to a plurality of downstream bubblers, 46a, 46b and 46c. Each of the upstream bubblers has an upstream mouth 44a-m, 44b-m and 44c-m and each of the downstream bubblers has a downstream mouth 46a-m, 46b-m and 46c-m. The respective bubblers are arranged to provide a selected mouth elevation differential between upstream and downstream bubblers so that one of a variety of mouth elevation differentials may be selected by passing one of the three upstream bubblers with one of the three downstream bubblers. The bubblers may be dimensioned and/or positioned so that each downstream bubbler has its mouth located at an elevation below that of the lowest mouth elevation of any upstream bubbler so that amy combination of one upstream and one downstream bubbler may be selected. Alternatively, one or more of the downstream bubblers may have their mouths at elevations above the lowest or lower ones of the upstream bubbler. With a plurality of bubblers, different mouth elevation differentials may be selected and/or different absolute elevations for paired bubblers may be selected to accommodate different overall water levels.

In order to effectuate such selection, each of the bubblers is provided with a valve at or near its upper end, valves A, B and C being provided, respectively, in each of upstream bubblers 44a, 44b and 44c and valves D, E and F being provided, respectively, in each of downstream bubblers 46a, 46b and 46c. Control lines 60a60b, 60c, 60d, 60e and 60f lead, respectively, from each of valves A, B, C, D, E and F to a control box (not shown) which serves to selectively open and close valves A-F in order to leave open one of the pairs of upstream and downstream bubblers while closing off the other pairs of upstream and downstream bubblers. Alternatively, or in addition, instead of control lines leading to a control box for selectively opening and closing valves A-F, each of the valves may be provided with a manually operated handle in order the set the valves manually. In operation, a selected one of upstream and downstream bubbler pairs, e.g., pairs 44a/46a, 44b/46b or 44c /46c, may be activated. For example, at low water levels, bubbler pair 44a/46a may be utilized, at intermediate water levels bubbler pair 44b/46b may be utilized, and at higher water levels bubbler pair 44c/46c may be utilized. For another example, in order to change the mouth elevation differential, bubbler pair 44a/46a may be replaced by bubbler pair 44a/46b.

In another embodiment, a single pair of bubblers such as bubblers 44 and 46 illustrated in FIG. 1 may be adjustably mounted so that their respective upstream and downstream mouths 44m, 46m can be positioned at different elevations for the purpose of accommodating different overall water levels and/or for the purpose of adjusting the mouth elevation differential.

The invention thus is seen to also provide for a plurality of pairs of the upstream and downstream bubblers connected to the source of compressed gas and having their mouths located at different elevations, and shut-off means operative to isolate individual bubblers from the bubbler system. In this way, one set of paired upstream and downstream bubblers may be selectively activated by being connected to the source of compressed gas and the other bubblers inactivated by being isolated from the source of compressed gas.

FIG. 3 illustrates a modification of the bubbler design in which a downstream bubbler 62, which may be substituted for bubbler 46 in the arrangement illustrated in FIG. 1, has a lower portion 62a which is of greater diameter than the main portion of bubbler 62 and defines the bubbler mouth 62m. A conventional float switch 66 is mounted within the lower portion 62a of bubbler 62, adjacent to the mouth 62m thereof, and serves as an auxiliary liquid level sensing means. Float switch 66 includes a tube member 66a made of a nonmagnetic material and within which a reed switch (not shown) is mounted. A float member forming part of switch 66 carries a magnet which operates the reed switch according to the elevation at which the magnet is positioned by the level 64 of water within the lower portion 62a of bubbler 60. A pair of lines 68a, 68b connects the reed switch into a suitable electric circuit which operates an alarm and/or actuating mechanism. The water level 64 inside bubbler 62 is held below the downstream water level 70 outside the bubbler by the pressure of the compressed air inside bubbler 62. If the air pressure within bubbler 62 stays constant while downstream water level 70 drops, the water level 64 inside bubbler 62 will drop as the water pressure head acting against the bubbler air pressure decreases. (The water level 64 will also drop if the air pressure in the bubbler decreases, e.g., because of a drop in the upstream water level, by less than the loss in pressure head at mouth 62m.) In either case, when the water level 64 drops sufficiently, float switch 66 can signal an alarm and/or trigger raking of the trash screen before the water level 64 is expelled entirely from within bubbler 62, at which point generation of the control signal by downstream bubbler 62 would commence. Thus, the float switch 66 within the bubbler 62 can be used as an early warning device and/or to trigger automatic or manual remedial action, such as raking, prior to the point at which the water level differential exceeds the elevation difference between the mouths of the upstream and downstream bubblers. A float switch may be employed within the upstream bubbler, which will be kept free of water by the compressed air until the downstream level drops sufficiently relative to the upstream level, to cause the control signal to be generated by the downstream bubbler. As explained above, this occurs when the downstream bubbler is submerged below the downstream level a depth less than that by which the upstream mouth is submerged below the upstream level. In such case, water will rise into the lower portion of the upstream bubbler and the float switch then will be activated to initiate raking of the trash screen and/or sound an alarm. Thus, by positioning a float switch within one or both of the upstream and downstream bubblers, the entry of water into the upstream bubbler, or the fall of the water level within the downstream bubbler, can be monitored to provide an early warning of changing water level and/or to initiate corrective action.

As used herein and in the claims, reference to the auxiliary liquid level sensing means being located "adjacent to the mouth" of the bubbler means that the auxiliary sensing means, e.g., the float switch, is positioned to sense changes in water level which occur within the bubbler as the liquid level differential increases and approaches the mouth elevation differential.

Referring now to FIG. 4, there is shown another embodiment of a bubbler 72 which has a lower portion 74 which is bent at approximately a 90° angle to the axis of the main portion of bubbler 72, thus positioning the plane of bubbler mouth 72$m$ vertically and facing in the direction from which the liquid or water is flowing, as indicated by the un-unmbered arrow in FIG. 4. With this arrangement, the Venturi effect of water flowing parallel to the horizontally disposed planes of the mouths of the bubblers illustrated in FIGS. 1 and 2 is overcome. In fact, by positioning mouth 72$m$ to face the flowing liquid, the pressure acting on mouth 72$m$ is somethat increased because the static head imposed by the depth of water between mouth 72$m$ and liquid level 76 will be augmented by the tendency of the water or other liquid to flow into mouth 72$m$ against the pressure of the compressed gas therein. By positioning mouth 72$m$ in a direction facing upstream, reduction in the back-pressure in bubbler 72 by the Venturi effect of the flowing liquid is avoided. In most cases, when used for controlling water flowing through a water course as in the water box illustrated in FIG. 1, the rate of flow of the water is so low that the resultant Venturi effect is not significant. However, in some cases of high velocity flows, an arrangement such as that illustrated in FIG. 4 may be useful in avoiding undesired reductions in the back-pressure sustainable in the bubbler.

Generally, the operation of the control device of the invention is unaffected by the water level control set point which may be independently adjusted by scaling up or down of the back-pressure sensed in branch conduit 48$a$.

While any upstream and downstream level sensing device may be utilized, an arrangement of gas bubblers, for example, compressed air bubblers, as schematically illustrated in FIG. 1 is preferred. Thus, the upstream and downstream liquid level sensors of the invention may comprise respective upstream and downstream gas bubblers connected in gas flow communication to each other and to a source of compressed gas, each bubbler having a respective mouth, the mouth of the upstream bubbler being disposed upstream of the flow restriction at a first elevation below the surface of the upstream liquid, and the mouth of the downstream bubbler being positioned downstream of the flow restriction at a second elevation below the first elevation and below the surface of the downstream liquid. It may also be desirable to enable adjusting the elevation of the upstream and downstream mouths (44$m$ and 46$m$ in FIG. 1) either by constructing the bubblers 44 and 46 so that they may be vertically adjusted and/or by providing a plurality of valved upstream and downstream bubblers, as described above. One way of adjusting the elevation of the upstream and downstream mouths of the bubblers is to provide an adjustable sleeve at the lower end of the bubblers which may be raised or lowered to adjust the elevation.

It will be appreciated that numerous structural features, such as decks, walkways and ladders, additional trash screens (such as one positioned above the water pond to prevent airborne debris from falling into it), controls, heating elements, temperature and other sensors, recording devices and the like often associated with hydroelectric plants have been omitted from the description and the drawings, inasmuch as the design and utilization of such features is well known to those skilled in the art.

While the invention has been described in detail with respect to specific embodiments thereof, it will be appreciated that numerous variations may be made to the specific embodiments described and illustrated, which variations nonetheless lie within the spirit of the invention and the scope of the appended claims.

What is claimed is:

1. A control apparatus responsive to liquid levels upstream and downstream of a flow restriction in a courseway of the liquid, the apparatus comprising:
    an upstream liquid level sensor comprising means to generate an upstream signal which is proportional to the upstream liquid level;
    a downstream liquid level sensor comprising means to generate a downstream signal which is proportional to the downstream liquid level; and
    transducer means connected to both the upstream and downstream liquid level sensors and comprising means to generate a control signal which is normally responsive to the upstream signal but becomes responsive to the downstream signal when, due to relative lowering of the downstream liquid level with respect to the upstream liquid level, the magnitude of the difference between the upstream and downstream signals exceeds a preselected value.

2. The apparatus of claim 1 further including a flow regulator located in the courseway downstream of the flow restriction and responsive to the transducer for operation of the flow regulator in response to the control signal.

3. The apparatus of claim 1 wherein the upstream and downstream liquid level sensors comprise respective upstream and downstream gas bubblers connected in gas flow communication to each other and to a source of compressed gas, each bubbler having a respective mouth, the mouth of the upstream bubbler being disposed upstream of the flow restriction at a first elevation below the upstream liquid level, and the mouth of the downstream bubbler being positioned downstream of the flow restriction at a second elevation below the first elevation and below the downstream liquid level.

4. The apparatus of claim 3 further including auxiliary liquid level sensing means located within at least one of said bubblers adjacent to the mouth thereof and connected to a remote signal receptor to provide to said receptor a signal responsive to the water level within the bubbler containing the auxiliary sensing means.

5. A control apparatus responsive to respective water levels upstream and downstream of a flow restriction located in a water course, the apparatus comprising:
a bubbler system comprising an upstream gas bubbler and a downstream gas bubbler connected in gas flow communication with each other and to a source of compressed gas, the upstream bubbler having an upstream mouth and the downstream bubbler having a downstream mouth positioned at an elevation below that of the upstream mouth whereby pressurization of the bubblers with both mouths submerged below water provides a common system pressure;
transducer means connected to the bubbler system and comprising means to generate a control signal in response to the system pressure which is normally determined by the pressure head imposed on the upstream mouth by the upstream water level but becomes determined by the pressure head imposed on the downstream mouth by the downstream water level when, due to lowering of the downstream water level relative to the upstream water level, the magnitude of the difference between the upstream and downstream water levels exceeds the difference in elevation between the upstream mouth and the downstream mouth; and
a water flow regulator located downstream of the flow restriction and responsive to the control signal.

6. The apparatus of claim 5 wherein the transducer is connected by a signal line to the water flow regulator.

7. The apparatus of claim 5 or claim 6 wherein the water flow regulator controls the water flow through a hydroelectric turbine, and the flow restrictor comprises a trash screen.

8. The apparatus of any one of claims 5, 6 or 7 further including a plurality of said upstream and downstream bubblers connected to the source of compressed gas and having their mouths located at different elevations, and shutoff means operative to isolate individual bubblers from the bubbler system, whereby one set of paired upstream and downstream bubblers may be selectively activated by being connected to the source of compressed gas and the other bubblers inactivated by being isolated from the source of compressed gas.

9. The apparatus of any one of claims 5, 6 or 7 wherein at least one of the gas bubblers is dimensioned and configured to face the mouth thereof in the direction from which the water is flowing.

10. The apparatus of any one of claims 5, 6 or 7 further including auxiliary water level sensing means comprising a float switch located within at least one of said bubblers adjacent to the mouth thereof and connected to a remote signal receptor to provide to said receptor a signal responsive to the water level within the bubbler containing the float switch.

11. The apparatus of claim 5 wherein at least one of said bubblers has a lower portion which is bent to position the plane of its mouth facing in the direction from which the water is flowing.

12. A method for controlling an operating mechanism by means of a control apparatus responsive to respective liquid levels upstream and downstream of a flow restriction in the courseway of the liquid, the method comprising:
sensing the upstream liquid level and generating an upstream signal which is proportional to the upstream liquid level;
sensing the downstream liquid level and generating a downstream signal which is proportional to the downstream liquid level;
generating a control signal in response to the upstream signal unless the magnitude of the difference between the upstream and downstream signals in response to a lowering of the downstream liquid level relative to the upstream liquid level exceeds a pre-selected value, in which case the control signal is generated in response to the downstream signal; and
transmitting the control signal to the operating mechanism to operate the operating mechanism in response to the control signal.

13. The method of claim 12 including generating the upstream and downstream signals by sensing the system pressure generated by equally pressurizing a gas bubbler system comprised of an upstream bubbler and a downstream bubbler connected in gas flow communication with each other, the upstream bubbler having an upstream mouth and the downstream bubbler having a downstream mouth positioned at an elevation below that of the upstream mouth, maintaining both mouths below the surface of the liquid so that the upstream mouth is sealed by the liquid pressure head imposed on it by the upstream liquid level and the downstream mouth is sealed by the liquid pressure head imposed on it by the downstream pressure level, whereby the system pressure is determined by the lower of the pressure heads existing at the upstream and downstream mouths.

14. The method of claim 13 including transmitting the control signal to a flow regulator located in the courseway of the liquid downstream of the flow restriction.

15. The method of claim 13 or claim 14 wherein the courseway is a water course and the flow regulator is a water flow regulator which controls the flow of water through a hydroelectric turbine.

16. The method of claim 12 or claim 13 further including measuring the liquid level within at least one of the upstream and downstream bubblers and generating a signal when the liquid level within the bubbler reaches a predetermined level.

* * * * *